(12) United States Patent
Cho et al.

(10) Patent No.: US 7,941,186 B2
(45) Date of Patent: May 10, 2011

(54) APPARATUS AND METHOD FOR SCHEDULING MULTIUSER/SINGLE USER IN MULTIPLE INPUT MULTIPLE OUTPUT (MIMO) SYSTEM

(75) Inventors: Myeon-Kyun Cho, Seongnam-si (KR); Sung-Jin Kim, Suwon-si (KR); Ho-Jin Kim, Seoul (KR); Cheol-Woo You, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 958 days.

(21) Appl. No.: 11/782,629

(22) Filed: Jul. 24, 2007

(65) Prior Publication Data

US 2008/0025336 A1    Jan. 31, 2008

(30) Foreign Application Priority Data

Jul. 25, 2006  (KR) .................. 10-2006-0069879

(51) Int. Cl.
*H04M 1/00* (2006.01)
*H04W 4/00* (2009.01)
*H04B 7/216* (2006.01)

(52) U.S. Cl. ............... 455/561; 455/126; 455/127.1; 370/328; 370/342

(58) Field of Classification Search .......... 370/328–329, 370/342–345, 347; 455/500–510, 561–562.1, 455/68, 69, 70, 126; 375/260–263

See application file for complete search history.

(56) References Cited

U.S. PATENT DOCUMENTS

| | | | | |
|---|---|---|---|---|
| 7,778,342 | B2* | 8/2010 | Larsson et al. | 375/267 |
| 2006/0188031 | A1* | 8/2006 | Liu | 375/260 |
| 2007/0249401 | A1* | 10/2007 | Kim et al. | 455/562.1 |
| 2007/0250638 | A1* | 10/2007 | Kiran et al. | 709/236 |
| 2007/0268900 | A1* | 11/2007 | Park et al. | 370/390 |
| 2008/0080635 | A1* | 4/2008 | Hugl et al. | 375/267 |
| 2008/0132281 | A1* | 6/2008 | Kim et al. | 455/562.1 |
| 2008/0176593 | A1* | 7/2008 | Bachl et al. | 455/522 |
| 2008/0212701 | A1* | 9/2008 | Pan et al. | 375/260 |
| 2008/0311939 | A1* | 12/2008 | Hugl et al. | 455/507 |

FOREIGN PATENT DOCUMENTS

| | | | | |
|---|---|---|---|---|
| KR | 10-2006-0005681 A | * | 1/2006 | |
| KR | 10-2006-0096365 A | * | 9/2006 | |

* cited by examiner

*Primary Examiner* — Thai D Hoang
(74) *Attorney, Agent, or Firm* — Jefferson IP Law, LLP

(57) ABSTRACT

An apparatus and method for scheduling a multiuser and a single user in a Multiple Input Multiple Output (MIMO) system are provided. The method for scheduling a multiuser and a single user at BS in MIMO system includes determining ratios of MultiUser-MIMO (MU-MIMO) chunks and Single User-MIMO (SU-MIMO) chunks to allocation chunks, determining the MU-MIMO chunks in the determined ratio and the remaining chunks as the SU-MIMO chunks, transmitting chunk information relating to the determined chunks to one or more Mobile Stations (MSs), and, when Channel Quality Information (CQI) feedback information relating to the determined MU-MIMO chunks and the determined SU-MIMO chunks is received from the MSs, allocating chunks and streams for MU-MIMO/SU-MIMO to users who maximize overall capacity using the CQI feedback information.

15 Claims, 5 Drawing Sheets

APPARATUS AND METHOD FOR SCHEDULING MULTIUSER/SINGLE USER IN MULTIPLE INPUT MULTIPLE OUTPUT (MIMO) SYSTEM

PRIORITY

This application claims the benefit under 35 U.S.C. §119(a) to a Korean patent application filed on Jul. 25, 2006 in the Korean Intellectual Property Office and assigned Serial No. 2006-69879, the entire disclosure which is hereby incorporated by reference.

BACKGROUND OF THE INVENTION

1. Field of the Invention

The present invention relates generally to a Multiple Input Multiple Output (MIMO) system. More particularly, the present invention relates to an apparatus and method for scheduling a multiuser and a single user.

2. Description of the Related Art

A Multiple Input Multiple Output (MIMO) scheme, which allocates a plurality of data streams to a plurality of users, is a Spatial Division Multiple Access (SDMA) scheme capable of achieving Multiuser Diversity (MUDiv) by allocating a data stream to a user with optimal channel condition using a spatial domain.

Of conventional technologies, Per User Unitary feedback/beamforming and Rate Control (PU2RC) is the only technology that enables Spatial Multiplexing (SM) for allocating several data streams to the same user and the SDMA for allocating several data streams to multiple users at the same time. Herein, it is defined that the SM is a Single-User MIMO (SU-MIMO) scheme and the SDMA is a Multiuser MIMO (MU-MIMO) scheme.

The SU-MIMO scheme maximizes a peak data rate by using an advanced receiver technique such as Successive Interference Cancellation (SIC). The MU-MIMO scheme maximizes the overall system throughput by acquiring the MUDiv by allotting several data streams to a user that exhibits a maximum capacity through competition with the multiple users.

The MU-MIMO scheme aims at a different purpose than the SU-MIMO scheme but also uses the different Channel Quality Information (CQI) feedback as fundamentally required by the closed loop MIMO scheme. The MU-MIMO scheme feeds back the CQI according to a feedback scheme when each user calculates a precoding matrix based Signal-to-Interference and Noise Ratio (SINR) based on a Minimum Mean-Squared Error (MMSE) receiver technique. By contrast, the SU-MIMO scheme calculates and feeds back the stream SINR based on a SIC receiver technique.

Different kinds of CQI feedback methods include a full CQI feedback, a partial CQI feedback, and a reduced CQI feedback. Regarding the full CQI feedback method, when the transmitter uses G-ary precoding matrixes, the receiver calculates SINR of acquirable streams with respect to every precoding matrix and feeds back every SINR to the transmitter. The full CQI feed back method is impracticable because it must process too much feedback information. The partial CQI feedback method feeds back the preceding matrix index of the maximum sum rate of the stream SINR among the calculated stream SINRs of the precoding matrixes, and the stream SINR acquirable for the corresponding preceding matrix. The partial CQI feedback achieves a practical tradeoff between throughput and redundancy. The transmitter groups feedback information received from the users to the same preceding matrix and selects a user who has fed back the best stream SINR of each precoding matrix, to thereby allocate the corresponding streams to users that maximize the stream SINR sum rate acquirable for the corresponding precoding matrix. The reduced CQI feedback method feeds back to the transmitter the preceding matrix index of the best sum rate of the stream SINR, the index of the stream index acquiring the best SINR of the stream SINRs of the corresponding precoding matrix, and the SINR acquirable at the receiver using the preceding matrix and the stream. The reduced CQI feedback method requires the least CQI feedback amount and its performance is as good as the partial CQI feedback when the number of users is large. Hence, the reduced CQI feedback is the most practical CQI feedback scheme of the SDMA.

In the mean time, if the MIMO system adopts conventional SU-MIMO and MU-MIMO to schedule a multiuser and a single user, a static SU-MIMO and MU-MIMO switching scheme and a dynamic SU/MU-MIMO scheme are available.

The static SU-MIMO and MU-MIMO switching scheme performs only SU-MIMO or MU-MIMO in general by taking into account the channel condition of the upper layer and the number of users. While the static SU-MIMO and MU-MIMO switching scheme might be the simplest scheme, the overall efficiency is prone to deteriorate because neither the MU-MIMO nor the SU-MIMO are executable, and thus the optimization for maximizing the system capacity is not obtained.

In contrast, according to the dynamic SU/MU-MIMO scheme which is contrary to the static switching scheme, every user calculates suitable CQI on the assumption that it will be serviced using MU-MIMO (SDMA) or SU-MIMO (SM), and then feeds back the calculation result to the transmitter. In doing so, every user feeds back (the reduced CQI feedback) the precoding matrix and the stream index highly preferred for the SDMA service and the SINR acquirable at the receiver when the transmitter uses the precoding matrix and the stream, and feeds back (the partial CQI feedback) the stream SINRs calculated for the SM service with the SIC. The transmitter determines which is better to service using SU-MIMO or MU-MIMO with respect to the allocated chunks, and allocates the chunks so as to maximize the system capacity. The dynamic SU/MU-MIMO scheme can also maximize the system capacity by allotting one of the MU-MIMO and the SU-MIMO, which maximizes the sum rate, to the user. However, since each user needs to calculate and feed back both the reduced CQI feedback for the MU-MIMO and the partial CQI feedback for the SU-MIMO, the dynamic SU/MU-MIMO scheme is subject to the shortcoming that the required CQI feedback amount is considerable. In addition, if the dynamic SU/MU-MIMO scheme is expanded to Orthogonal Frequency Division Multiplexing (OFDM), N times more feedback overhead is required linearly.

SUMMARY OF THE INVENTION

An aspect of the present invention is to address at least the above problems and/or disadvantages and to provide at least the advantages described below. Accordingly, an aspect of the present invention is to provide an apparatus and method for scheduling a multiuser and a single user in a MIMO system.

Another aspect of the present invention is to provide a multiuser and single user scheduling apparatus and method for preventing scheduling complexity and unnecessary CQI feedback by utilizing chunks of the entire frequency band for MU-MIMO and the remaining chunks for SU-MIMO in a MIMO system.

A further aspect of the present invention is to provide a scheduling apparatus and method for maximizing the overall system capacity by adaptively changing the ratios of the MU-MIMO chunks and the SU-MIMO chunks to the allocated chunks according to the channel condition or the number of users in a MIMO system.

Still another aspect of the present invention is to provide a scheduling apparatus and method for maximizing a multiuser diversity gain by a transmitter pre-designating MU-MIMO chunks and receiving CQI for MU-MIMO fed back from every user with respect to the designated chunks so as to allow more users to compete for specific chunks in MIMO system.

According to an aspect of the present invention, a method for scheduling a multiuser and a single user at a BS in MIMO system is provided. The method includes determining ratios of MU-MIMO chunks and SU-MIMO chunks to allocation chunks, determining the MU-MIMO chunks in the determined ratio and the remaining chunks as the SU-MIMO chunks, and transmitting chunk information relating to the determined chunks to one or more Mobile Stations (MSs), and when CQI feedback information relating to the determined MU-MIMO chunks and the determined SU-MIMO chunks is received from the MSs, allocating chunks and streams for MU-MIMO/SU-MIMO to users who maximize overall capacity using the CQI feedback information.

According to another aspect of the present invention, a method for transmitting feedback information from MS in MIMO system is provided. The method includes, when chunk information relating to MU-MIMO chunks and SU-MIMO chunks is received from BS, calculating CQIs with respect to the MU-MIMO chunks and the SU-MIMO chunks using the chunk information, selecting a certain number of SU-MIMO chunks having the highest CQI among the SU-MIMO chunks, and generating CQI feedback information using CQI relating to the certain number of the selected SU-MIMO chunks and CQI relating to the MU-MIMO chunks.

According to still another aspect of the present invention, an apparatus for scheduling a multiuser and a single user in a MIMO system is provided. The apparatus includes a chunk determiner for determining ratios of MU-MIMO chunks and SU-MIMO chunks to allocation chunks, for determining the MU-MIMO chunks in the determined ratio, and for determining the remaining chunks as the SU-MIMO chunks, and a user selector for transmitting chunk information relating to the determined chunks to one or more MSs, and for allocating MU-MIMO/SU-MIMO chunks and streams to users who maximize overall capacity using CQI feed back information when the CQI information relating to the determined MU-MIMO chunks and SU-MIMO chunks is received from the MSs.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for scheduling a multiuser and a single user in Multiple Input Multiple Output (MIMO) system.

Figure 1:
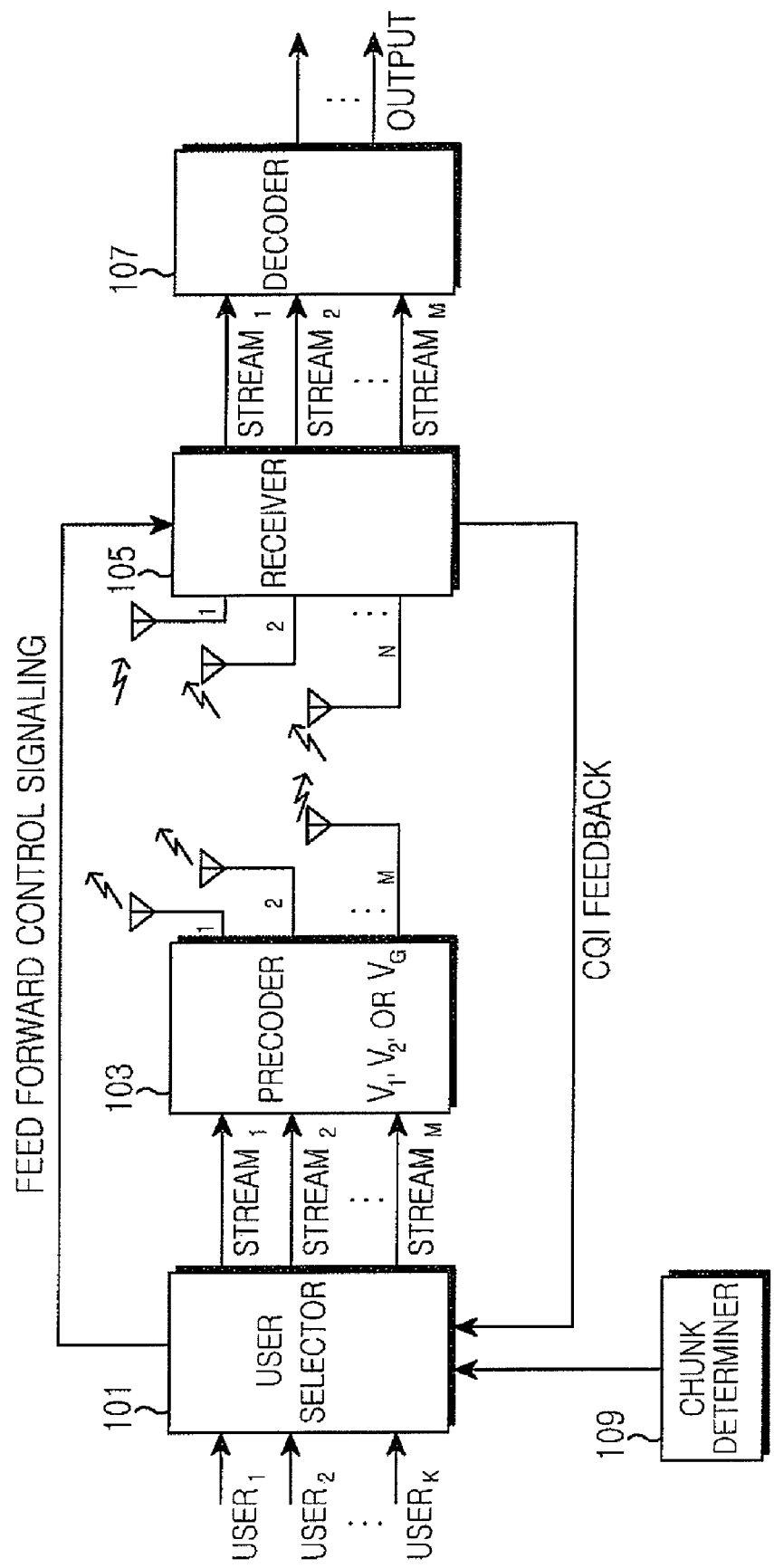
FIG. 1 is a block diagram illustrating a MIMO system according to an exemplary embodiment of the present invention.

FIG. 1 is a block diagram illustrating a MIMO system according to an exemplary embodiment of the present invention. An exemplary MIMO system includes a Base Station (BS) and a Mobile Station (MS). The BS includes a user selector 101, a precoder 103, and a chunk determiner 109. The MS includes a receiver 105 and a decoder 107. It is assumed that the MIMO system has M-ary transmit antennas and N-ary receive antennas.

The chunk determiner 109 of FIG. 1 adjusts and determines amounts of chunks for Single-User MIMO (SU-MIMO) and chunks for Multiuser MIMO (MU-MIMO) depending on the number of users to be scheduled or a data amount required by a single user. The chunk determiner 109 also predetermines MU-MIMO chunks according to the number of users and the channel condition of the users, and outputs the determined MU-MIMO and SU-MIMO chunks and a chunk index for the MU-MIMO to the user selector 101 first. The remaining chunks, except for the determined MU-MIMO chunks, are determined as the SU-MIMO chunks afterward.

The user selector 101 sends chunk information to users through a feed forward control signaling. The chunk information transmitted to the users through the feed forward control signaling includes the determined chunk index and the preceding index used for the MU-MIMO, and the chunk index and the precoding index used for the SU-MIMO. Next, upon receiving Channel Quality Information (CQI) feedback information with respect to the determined MU-MIMO chunks and SU-MIMO chunks from the users, the user selector 101 allocates MU-MIMO/SU-MIMO chunks and streams to users that maximize the overall downlink capacity using the CQI feedback information.

The precoder 103 generates transmit symbols using a corresponding precoder matrix with data streams of the users allocated the chunks and the streams, that is, the user data streams to be transmitted simultaneously, and sends the generated transmit symbols to the users over the M-ary transmit antennas.

The receiver 105 of the MS receives the data from the BS on the N-ary receive antennas, splits the received data into streams, and outputs the streams to the decoder 107. Using the chunk information received from the user selector 101 of the BS through the feed forward control signaling, the receiver 105 calculates Signal-to-Interference and Noise Ratio (SINR), generates CQI feedback information, and transmits the generated CQI feedback information to the user selector 101. Specifically, when the BS transmits data using the precoding matrixes used for the MU-MIMO chunks and the SU-MIMO chunks, the receiver 105 calculates the stream SINR receivable at the MS and transmits to the user selector 101 the CQI feedback information relating to the most preferred M-ary chunks of the SU-MIMO chunks and the reduced feedback information relating to the determined MU-MIMO chunks. The receiver 105 calculates CQI as to the SU-MIMO chunks with SIC and calculates CQI as to the MU-MIMO chunks with Minimum Mean-Squared Error (MMSE).

The decoder 107 outputs intended information by decoding the data streams provided from the receiver 105.

Figure 2:
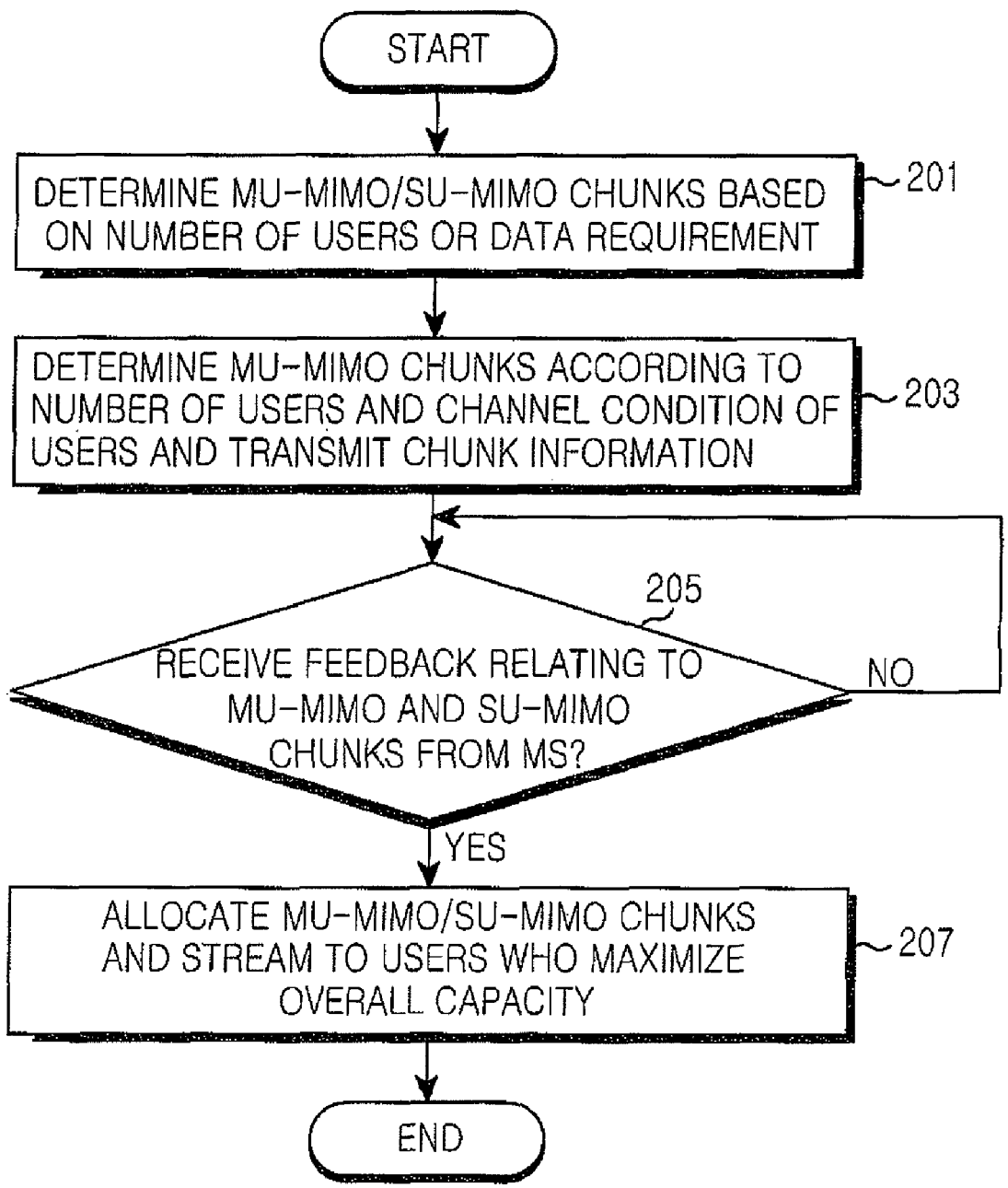
FIG. 2 is a flowchart illustrating a method for scheduling a multiuser and a single user at Base Station (BS) in the MIMO system according to an exemplary embodiment of the present invention.

FIG. 2 is a flowchart illustrating a method for scheduling a multiuser and a single user at a BS in a MIMO system according to an exemplary embodiment of the present invention.

In FIG. 2, the BS adjusts and determines amounts of chunks for MU-MIMO and SU-MIMO depending on the number of users to be scheduled in the current frame or a data amount required by a single user in step 201. For example, when a great number of users are scheduled in the current frame or the data amount required by the single user is small, the BS may increase the ratio of the MU-MIMO chunks to the amount of the chunks to be allocated. When a small number of users is scheduled or the data amount required by the single user is large, the BS decreases the ratio of the MU-MIMO chunks and increases the ratio of the SU-MIMO chunks because it is hard to acquire MUDiv through the grouping due to the different unit matrixes (precoding matrixes) desired by the users. As such, by adaptively adjusting the amounts of the MU-MIMO chunks and the SU-MIMO chunks, the system can guarantee a peak data rate required by users.

Figure 4:
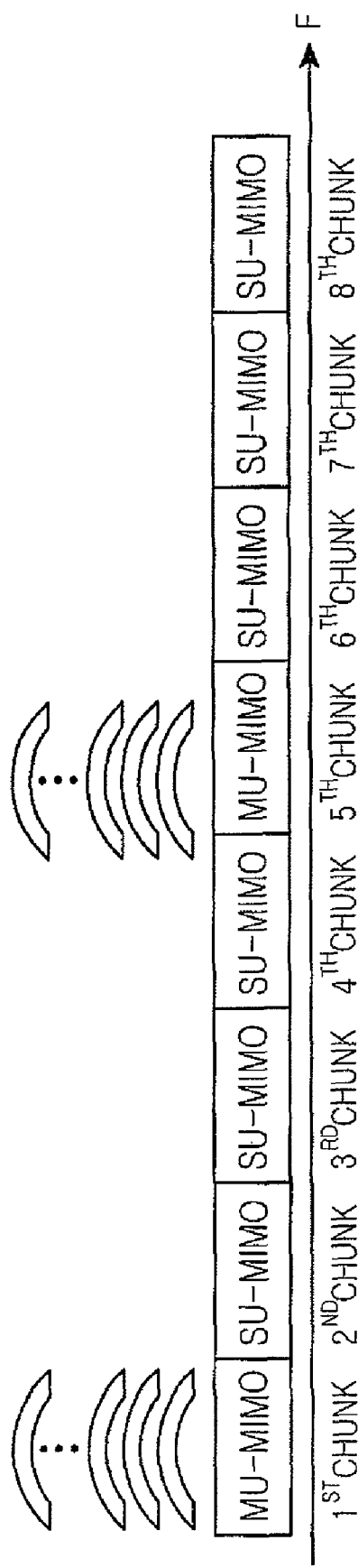
FIG. 4 is a diagram illustrating the frequency scheduling method in the MIMO system according to an exemplary embodiment of the present invention.

In step 203, to maximize MUDiv gain by allowing more users to participate in the competition, the BS adaptively determines MU-MIMO chunks depending on the number of the users and the channel condition of the users and transmits chunk information to the users through the feed forward control signaling. Herein, the frequency chunks for the MU-MIMO may be set to frequency chunks in successive positions or in separate positions. In this case, the position of the frequency chunks is of little account. For instance, the BS in FIG. 4 can designate first and fifth frequency chunks as the MU-MIMO chunks and the remaining frequency chunks as the SU-MIMO chunks. The chunk information includes the fixed chunk index; that is, the designated MU-MIMO chunk index, and the other chunk index; that is, the SU-MIMO chunk index and the preceding indexes used for the respective chunks. The users feed back to the BS the CQI for the MU-MIMO merely with respect to the designated arbitrary chunks. In other words, the users do not have to feed back the information relating to their preferred MU-MIMO chunks, to thereby reduce the overhead that much. In case of Spatial Division Multiple Access (SDMA), most of the gain is established on the MUDiv attained by allotting the data streams to users of the good channel condition through the competitions of the users. Hence, there is little difference in terms of the throughput when the users feed back the CQI information relating to the pre-designated arbitrary chunks, rather than feeding back the preferred MU-MIMO chunks and the CQI information of the corresponding chunks to the BS.

In step 205, the BS determines whether the CQI feedback information relating to the determined MU-MIMO chunks and SU-MIMO chunks is received from the users. The CQI feedback information includes the reduced feedback information as to the determined MU-MIMO chunks, and the CQI feedback information as to the most preferred M-ary chunks of the SU-MIMO chunks. Where, the reduced feedback is composed of CQIs for each stream and preferred preceding matrix for the given chunk.

Receiving the CQI feedback information, the BS allocates MU-MIMO/SU-MIMO chunks and streams to users who maximize the overall downlink capacity based on the CQI feedback information in step 207. More specifically, in case of the MU-MIMO chunks, the BS allocates data streams to users who maximize the overall data capacity among multiple users applying for the chunk allocation. By selecting the user who feeds back the best SINR by streams of the corresponding chunks, the BS allots the corresponding data streams to users who maximize the SINR sum rate by streams. With respect to the remaining chunks, that is the SU-MIMO chunks, the BS allocates the corresponding chunks and all data streams to the user that maximizes the sum rate based on the preferred chunks and the CQI feedback information provided by the users.

Next, the BS terminates the algorithm according to an exemplary embodiment of the present invention.

Figure 3:
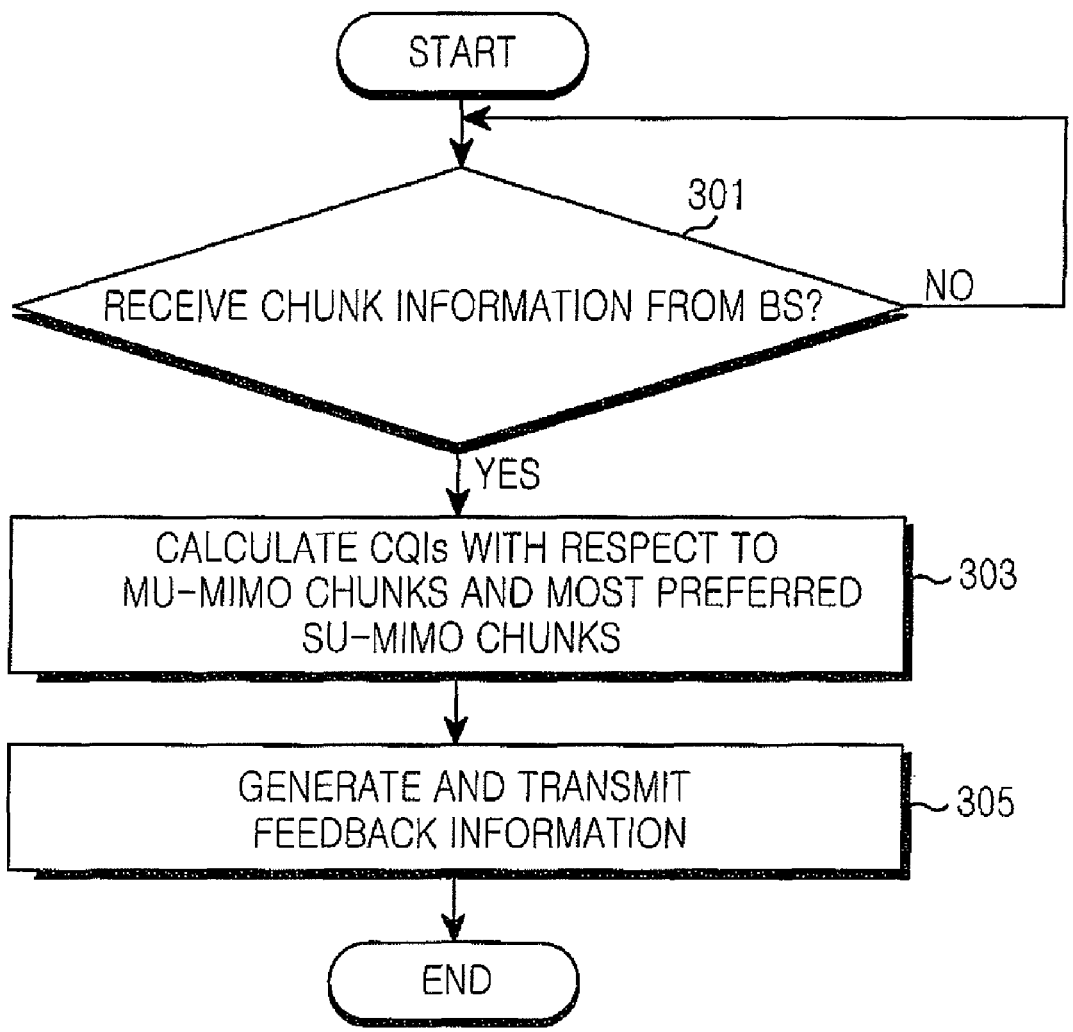
FIG. 3 is a flowchart illustrating a method for transmitting feedback information from Mobile Station (MS) in the MIMO system according to an exemplary embodiment of the present invention.

FIG. 3 is a flowchart illustrating a method for generating and transmitting feedback information from MS in the MIMO system according to an exemplary embodiment of the present invention.

In FIG. 3, the MS determines whether the chunk information is received from the BS through the feed forward control signaling in step 301. The chunk information includes the index of the fixed chunks determined to be allocated in the current frame; that is, the MU-MIMO chunk index and the other chunk index; that is, the SU-MIMO chunk index and the precoding indexes used for the respective chunks.

Upon receiving the chunk information, the MS calculates CQI for the determined MU-MIMO and CQI for the most preferred M-ary chunks of the SU-MIMO chunks in step 303. The CQI for the SU-MIMO chunks is the partial CQI feedback calculated based on the SIC receiver, and the CQI for the MU-MIMO chunks is the reduced CQI feedback calculated based on the MMSE receiver. In other words, when the BS transmits data using the precoding matrixes used for the MU-MIMO chunks and the SU-MIMO chunks, the MS generates information relating to its receivable SINR and selects the most preferred M-ary chunks from the SU-MIMO chunks. Herein, the most preferred chunks indicate optimal chunks in view of the frequency selectivity.

In step 305, the MS generates CQI feedback information using the calculated CQIs and transmits the generated CQI feedback information to the BS. The CQI feedback information includes the reduced feedback relating to the determined MU-MIMO chunks, and CQI feedback information relating to the most preferred M-ary chunks of the SU-MIMO chunks. Since the SU-MIMO (SM) should allocate every data stream of the chunks to a single user, it is affected by the frequency selectivity. Thus, the MS needs to inform the BS of its most preferred chunks and the CQIs for all the streams of the preferred chunks.

Next, the MS terminates this algorithm.

Figure 5:
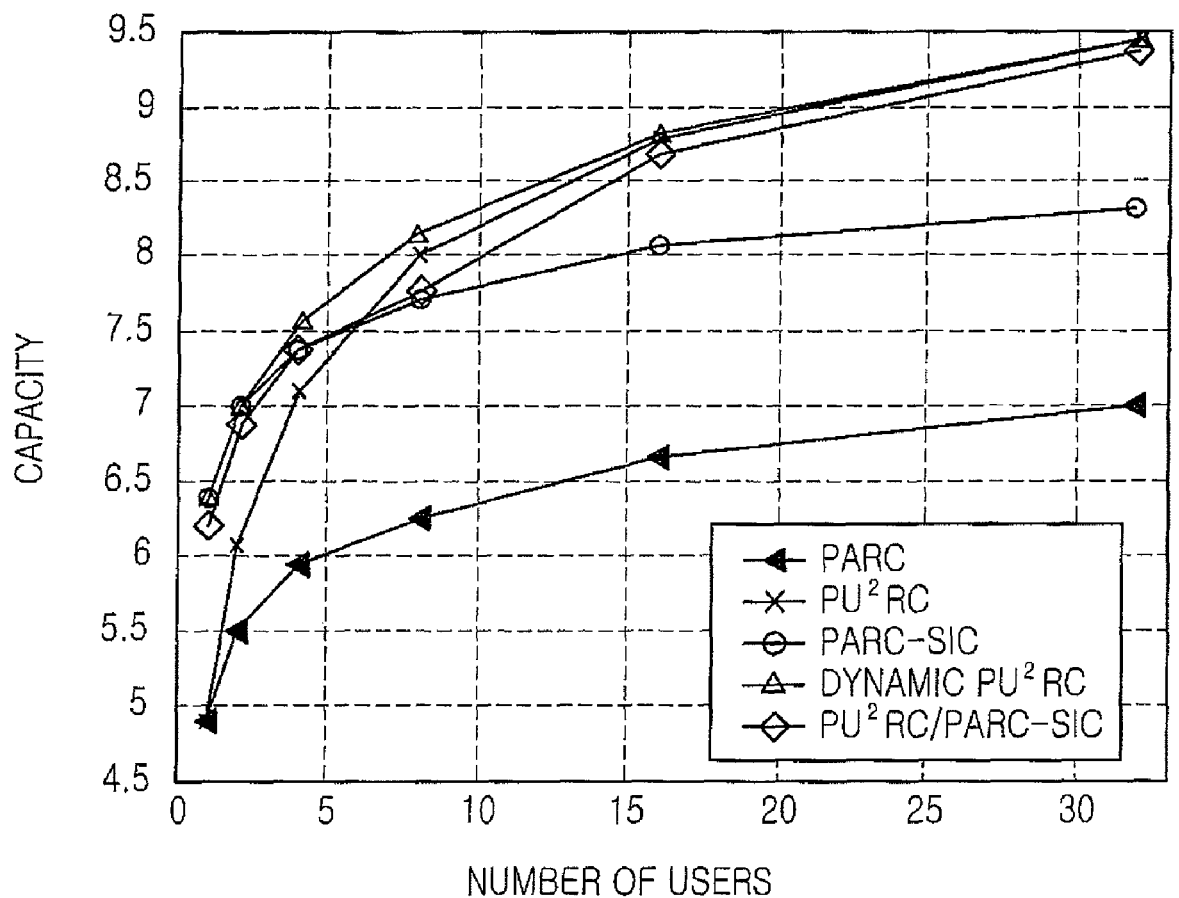
FIG. 5 is a graph for comparing technical performances of the conventional method and an exemplary embodiment of the present method.

FIG. 5 is a graph for comparing technical performance between the conventional method and an exemplary embodiment of the present method. According to an exemplary method of the present invention, when the number of users reaches ten, the ratio of the SDMA chunks to SM chunks is adaptively switched from 1:9 to 9:1 for comparison.

In FIG. 5, the present invention can exhibit far more advanced performance than the Per-Antenna Rate Control (PARC) of the conventional method, by virtue of the CQI feedback amount of about 80% and the low complexity allocation process, and guarantee the system capacity similar to the conventional dynamic PU2RC.

As set forth above, the multiuser and the single user are scheduled by using some chunks for the MU-MIMO (SDMA) and the remaining chunks for the SU-MIMO (SM) among the entire frequency band depending on the number of users or the channel condition in the MIMO system. Therefore, since more users are driven into specific chunks for the MU-MIMO (SDMA), the multiuser diversity gain is maximized, and there is no need to feed back the information of the preferred chunks, the CQI feedback amount of the specific chunks can be reduced. The frequency diversity can be maximized by feeding back the CQI with respect to the most preferred chunks of the SU-MIMO (SM) chunks by taking into account the frequency selectivity. Furthermore, the system throughput can be maximized by adaptively adjusting the ratios of the MU-MIMO (SDMA) chunks and the SU-MIMO (SM) chunks according to the number of users and the channel condition. In more detail, merely at the cost of the minimum CQI feedback overhead, the maximum multiuser diversity and frequency diversity can be attained at the same time and the scheduling complexity can be mitigated. Consequently, the maximum system capacity can be obtained.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for scheduling a multiuser and a single user at a Base Station (BS) in a Multiple Input Multiple Output (MIMO) system, the method comprising:
    determining ratios of MultiUser-MIMO (MU-MIMO) chunks and Single User-MIMO (SU-MIMO) chunks to allocation chunks;
    determining the MU-MIMO chunks in the determined ratio and the remaining chunks as the SU-MIMO chunks;
    transmitting chunk information relating to the determined chunks to one or more Mobile Stations (MSs); and
    when Channel Quality Information (CQI) feedback information relating to the determined MU-MIMO chunks and the determined SU-MIMO chunks is received from the one or more MSs, allocating chunks and streams for MU-MIMO/SU-MIMO to users that maximize overall capacity using the CQI feedback information.

2. The method of claim 1, wherein the determining of the ratios of MultiUser MU-MIMO and SU-MIMO chunks comprises:
    increasing the ratio of the MU-MIMO chunks when a number of users is large or a data amount required by a single user is small; and
    increasing the ratio of the SU-MIMO chunks when the number of the users is small or the data amount required by the single user is large.

3. The method of claim 1, wherein the transmitting of the chunk information comprises transmitting the chunk information to the MSs through a feed forward control signaling.

4. The method of claim 1, wherein the chunk information comprises at least one of an index of the determined MU-MIMO chunks, an index of the SU-MIMO chunks, and preceding indexes used for the respective chunks.

5. The method of claim 1, wherein the CQI feedback information comprises at least one of reduced feedback information relating to the determined MU-MIMO chunks, and CQI feedback information relating to a certain number of chunks having the highest CQI among the SU-MIMO chunks.

6. The method of claim 1, wherein the determining of the MU-MIMO chunks comprises using at least one of a number of users and a channel condition of the users.

7. The method of claim 1, wherein the determining of the ratios of the MU-MIMO chunks and the SU-MIMO chunks comprises using at least one of a number of users to be scheduled and a data amount required by a single user.

8. An apparatus for scheduling a multiuser and a single user in a Multiple Input Multiple Output (MIMO) system, comprising:
    a chunk determiner for determining ratios of MultiUser-MIMO (MU-MIMO) chunks and Single User-MIMO (SU-MIMO) chunks to allocation chunks, for determining the MU-MIMO chunks in the determined ratio, and for determining the remaining chunks as the SU-MIMO chunks; and
    a user selector for transmitting chunk information relating to the determined chunks to one or more Mobile Stations (MSs), and for allocating MU-MIMO/SU-MIMO chunks and streams to users that maximize overall capacity using Channel Quality Information (CQI) feed back information when the CQI information relating to the determined MU-MIMO chunks and SU-MIMO chunks is received from the MSs.

9. The apparatus of claim 8, wherein the chunk determiner increases the ratio of the MU-MIMO chunks when a number of users is large or a data amount required by a single user is small, and increases the ratio of the SU-MIMO chunks when the number of the users is small or the data amount required by the single user is large.

10. The apparatus of claim 8, wherein the user selector transmits the chunk information to the MSs through a feed forward control signaling.

11. The apparatus of claim 8, wherein the chunk determiner determines the MU-MIMO chunks using at least one of a number of users and a channel condition of the users.

12. The apparatus of claim 8, wherein the chunk determiner determines the ratios of the MU-MIMO chunks and the SU-MIMO chunks using at least one of a number of users to be scheduled and a data amount required by a single user.

13. The apparatus of claim 8, further comprising:
    the MS which calculates CQI relating to the determined MU-MIMO and CQI relating to the SU-MIMO chunks using the chunk information received from the user selector generates CQI feedback information relating to a certain number of chunks having the highest CQI among the SU-MIMO chunks and CQI feedback information relating to the determined MU-MIMO chunks, and transmits the CQI feedback information to the user selector.

14. The apparatus of claim 8, wherein the chunk information comprises at least one of an index of the determined MU-MIMO chunks, an index of the remaining SU-MIMO chunks, and preceding indexes used for the respective chunks.

15. The apparatus of claim 8, wherein the CQI feedback information comprises at least one of reduced feedback information relating to the determined MU-MIMO chunks, and CQI feedback information relating to a certain number of chunks having the highest CQI among the SU-MIMO chunks.

* * * * *